(12) United States Patent
Dominguez Vazquez et al.

(10) Patent No.: US 11,054,212 B2
(45) Date of Patent: Jul. 6, 2021

(54) EXTERNAL CHASSIS DEVICE COMPRISING AN INTERNAL MOVABLE ANCHORING SYSTEM FOR LONG FIREARMS

(71) Applicant: Jose Antonio Dominguez Vazquez, La Cisterniga (ES)

(72) Inventors: Jose Antonio Dominguez Vazquez, La Cisterniga (ES); Oscar De Castro Legido, Valladolid (ES)

(73) Assignee: Jose Antonio Dominguez Vazquez, La Cisterniga (ES)

( * ) Notice: Subject to any disclaimer, the term of this patent is extended or adjusted under 35 U.S.C. 154(b) by 0 days.

(21) Appl. No.: 16/769,950

(22) PCT Filed: Dec. 5, 2018

(86) PCT No.: PCT/ES2018/070784
§ 371 (c)(1),
(2) Date: Jun. 4, 2020

(87) PCT Pub. No.: WO2019/115851
PCT Pub. Date: Jun. 20, 2019

(65) Prior Publication Data
US 2020/0393213 A1     Dec. 17, 2020

(30) Foreign Application Priority Data
Dec. 12, 2017   (ES) .............................. ES201731512U

(51) Int. Cl.
*F41B 11/64* (2013.01)
*F41B 11/644* (2013.01)

(52) U.S. Cl.
CPC ................... *F41B 11/644* (2013.01)

(58) Field of Classification Search
CPC ........ F41B 11/644; F41C 23/06; F41C 23/08; F41A 3/66
(Continued)

(56) References Cited

U.S. PATENT DOCUMENTS 1,367,354 A * 2/1921 Craig ..................... F41C 23/06
                                                 89/42.01
3,636,648 A * 1/1972 Spencer .................... F41A 3/64
                                                 42/16
(Continued)

FOREIGN PATENT DOCUMENTS

ES      1082754U  U    6/2013
GB        2111656  A    7/1983

OTHER PUBLICATIONS

International Search Report dated May 20, 2019, which issued in the corresponding PCT Patent Application No. PCT/ES2018/070784, including English translation.

*Primary Examiner* — Joshua E Freeman
(74) *Attorney, Agent, or Firm* — Dickinson Wright PLLC

(57) ABSTRACT

The invention relates to an external chassis for a long firearm, the precision of which is increased owing to: 1. The incorporation of an external chassis, inside which the firearm is installed. 2. The anchoring of the firearm telescopically inside the external chassis using sliding rings with minimum friction. 3. The inclusion of a movement absorbing element. 4. The inclusion of guide bushings that limit the movement of the firearm to a single axis. With the above elements arranged as shown in the drawings, the inherent recoil produced in a firearm at the moment of firing, owing to the action-reaction effect of the stock-projectile assembly or the stock-discharge system, is suppressed and absorbed by the proposed invention, such that the stock remains immobile and no movement is transmitted to the shooter. As a result, precision is considerably increased and the optical sighting elements are not affected by sudden movements, thereby protecting these elements from possible damage and from being moved out of position. The elements described also ensure that the firearm moves only along the axis of the barrel, thereby guaranteeing precision. In addition, owing to (Continued)

the design of the invention, it can be incorporated not only into firearms having a specific new design, but also into existing firearms.

4 Claims, 2 Drawing Sheets

(58) Field of Classification Search
USPC .......................................................... 124/71
See application file for complete search history.

(56) References Cited

U.S. PATENT DOCUMENTS

| | | | | |
|---|---|---|---|---|
| 3,951,126 A * | 4/1976 | Rau | .................. | F41A 25/24 |
| | | | | 124/67 |
| 4,019,423 A * | 4/1977 | Johnson | .................. | F41A 3/62 |
| | | | | 89/178 |
| 4,088,057 A * | 5/1978 | Nasypany | .................. | F41C 23/06 |
| | | | | 89/1.701 |
| 4,473,964 A * | 10/1984 | Straub | .................. | F41A 25/22 |
| | | | | 124/68 |
| 4,503,632 A * | 3/1985 | Cuevas | .................. | F41A 21/28 |
| | | | | 42/1.06 |
| 4,524,671 A * | 6/1985 | Bender | .................. | F16C 29/04 |
| | | | | 384/51 |
| 7,478,495 B1 * | 1/2009 | Alzamora | .................. | F41C 23/04 |
| | | | | 42/74 |
| 7,878,184 B2 * | 2/2011 | Klarborg | .................. | F41B 11/646 |
| | | | | 124/65 |
| 8,449,346 B2 * | 5/2013 | Lee | .................. | F41B 11/644 |
| | | | | 446/405 |
| 9,080,823 B1 * | 7/2015 | Mantas | .................. | F41A 3/84 |
| 9,354,005 B1 * | 5/2016 | Russo | .................. | F41A 35/00 |
| 9,719,749 B1 * | 8/2017 | Prior | .................. | F41B 5/0094 |
| 10,557,674 B1 * | 2/2020 | Mantas | .................. | F41A 3/84 |
| 2005/0246931 A1 * | 11/2005 | Poff, Jr. | .................. | F41C 23/06 |
| | | | | 42/1.06 |
| 2010/0251587 A1 * | 10/2010 | Kincel | .................. | F41C 23/06 |
| | | | | 42/1.06 |
| 2013/0319217 A1 * | 12/2013 | Gangl | .................. | F41A 3/84 |
| | | | | 89/198 |
| 2014/0059909 A1 * | 3/2014 | Caudle | .................. | F41A 3/84 |
| | | | | 42/1.06 |
| 2014/0075798 A1 * | 3/2014 | Kincel | .................. | F41A 3/84 |
| | | | | 42/1.06 |
| 2015/0192380 A1 * | 7/2015 | Hilsabeck | .................. | F41C 23/06 |
| | | | | 42/1.06 |
| 2017/0184372 A1 * | 6/2017 | Ji | .................. | F41B 11/643 |
| 2018/0224227 A1 * | 8/2018 | Durham, III | .................. | F41A 3/82 |
| 2018/0259276 A1 * | 9/2018 | Doll | .................. | F41A 21/482 |

\* cited by examiner

EXTERNAL CHASSIS DEVICE COMPRISING AN INTERNAL MOVABLE ANCHORING SYSTEM FOR LONG FIREARMS

OBJECT OF THE INVENTION

As indicated in the title of this descriptive specification, the present invention relates to an EXTERNAL CHASSIS DEVICE COMPRISING AN INTERNAL MOVABLE ANCHORING SYSTEM FOR LONG GUNS, conceived and produced to provide numerous and substantial advantages over any conventional long gun. The present invention relates to an external chassis for a gun, the accuracy of which is increased owing to:

1.—The incorporation of an external chassis, inside which the gun is installed.
2.—The anchoring of the gun telescopically inside the external chassis using sliding rings with minimum friction.
3.—The inclusion of a movement absorbing element.
4.—The inclusion of guide bushings that limit the movement of the gun to a single axis.

The device will be described below.

BACKGROUND INFORMATION ON THE INVENTION

Guns are affected by the recoil occurring in the discharge of the projectile, which discharge is caused by the gases generated by the explosion of the ammunition. This recoil is in principle a linear motion towards the shooter in the direction opposite to the motion of the projectile and coaxial with the gun barrel.

Compressed air guns, and specifically "piston" type guns that compress air using a cylindrical chamber or compression cylinder, a piston or plunger driven by a spring of any type (pneumatic, metal or elastomer), suffer from a dual recoil. The first recoil takes place when the piston begins its displacement to initiate air compression and which causes a movement of the rest of the gun in the direction opposite to its stroke. Then, when the piston reaches the end of the stroke, a second recoil moves the gun in the direction opposite to the former direction. In both cases the movement is linear, in the same axis of displacement of the piston and coaxial with the barrel of the gun.

Obviously, these linear movements penalise the accuracy of the gun, as they are transmitted from the internal mechanisms to the gripping elements and from there to the hands and/or shoulder of the shooter. Thus, the initial coaxial linear motion is transformed into movements and rotations on the three axes, causing the displacement of the gun in any direction. As a result, depending on the grip of the gun, its weight, and its power, the cartridge in guns and the weight of the piston and power of the spring in compressed air guns, the movements can be greater or smaller and accuracy is affected.

In addition, as well as the above, to improve accuracy the user's action on the trigger should require as little force as possible, and the pressure on the trigger should be exerted for as short a time as possible, since a more forceful action on the trigger and the subsequent continued pressure after firing causes an undesirable movement, mainly a sideways movement towards the side of the hand with which the shooter pulls the trigger. Although the shot has been fired, the projectile still has not left the barrel of the gun and an error will be introduced into the desired trajectory, popularly referred to as 'yanking' In the present invention EXTERNAL CHASSIS DEVICE COMPRISING AN INTERNAL MOVABLE ANCHORING SYSTEM FOR LONG GUNS as the displacement of the gun due to recoil is allowed inside the external chassis, the trigger immediately moves away from the shooter's finger, minimising potential yanking.

As a secondary advantage, the optical sighting elements of the gun do not suffer from these movements that are deleterious to their mechanisms, as they are placed in the external chassis instead of on the gun itself, which remains independent from the movements generated by the gun. To fit the sighting element the chassis has the usual 11 mm dovetail rail and two orifices for bolting on any type of "Picattiny" or "Weaver" rail.

To improve accuracy, in view of the above, it is necessary to prevent the movements of the gun from being transmitted or modified by the shooter. This is the advantage provided by the invention disclosed herein.

According to the present invention, to provide:

1—Increased accuracy by placing the gun on a chassis external to same; and
2.—Increased accuracy of the gun by allowing a controlled longitudinal movement; and
3.—Increased accuracy and comfort by absorbing the linear movement in an element installed inside the chassis that prevents it from being transmitted to the shooter; and
4.—Increased accuracy by allowing to distance the trigger from the shooter's finger after the trigger has been pulled; and
5.—Increased safety of the optical sighting elements as they are isolated from the movement of the gun;

an external chassis separate from the gun is incorporated that houses the gun, the latter positioned internally by sliding rings with minimum friction and a free run to move inside said chassis, which in turn allows a conventional loading, shouldering and firing of the gun. Twisting of the gun in the chassis is prevented by bushings that slide in the grooves made on the chassis itself, anchored to the minimum friction rings. Installed in the same chassis is a kinetic energy absorbing device in the form of a metal spring, or air chamber, or elastomer, or electromagnetic element, or magnetic element.

Therefore, one object of the present invention is to disclose an external chassis device with an internal movable anchoring system for long guns that eliminates movements transmitted at the moment of firing to the shooter and that also eliminates the movements transmitted to the optical sighting elements.

Some anti-recoil elements are already known, but all of them are included inside the gun and do not employ a coaxial movement. For example, that of Industrias El Gamo, S.A., Publication number: ES0210145 U (1 May 1976), also published as: ES0210145 Y (16 Sep. 1976) with CIP prior to 2006.0LF41B. This document describes a system in which the entire assembly of elements that generate the discharge: barrel, sighting elements, compression chamber, piston, spring, and firing assembly, are free to move longitudinally along short guides inside a metal casing that conforms, together with the wooden stock and handguard, the rifle held by the shooter. This rifle was marketed under the name "Stamic".

The main differences with the proposed system for a EXTERNAL CHASSIS DEVICE WITH INTERNAL ANCHORING SYSTEM FOR LONG GUNS, is that the EXTERNAL CHASSIS DEVICE WITH INTERNAL ANCHORING SYSTEM FOR LONG GUNS has an external chassis that houses all of the mechanisms of the gun, which is a conventional gun, and excludes the sighting elements. Moreover, it has sliding rings with minimal friction only on the coaxial axis in a telescoping manner, provides a kinetic energy absorption element, and can be adapted to any gun with minimal modifications. All of the above differentiates it from the previously cited system of Industrias El Gamo S.A.

Another system similar to the previous one by Industrias El Gamo S.A. Is that of the German firm Diana, where the entire metal assembly of systems of the rifle is free to move longitudinally with respect to the wooden or polymer stock. It is commercially known as the Diana 54 Airking. The same differences as those indicated above for the "El Gamo" gun compared to that proposed by the present invention are present.

Another invention is the patent document for a SHOCK AND RECOIL DAMPER FOR A PNEUMATIC CARBINE system with reference ES 1082754 U, 21 U 201330572, which describes a system with a floating trigger in a conventional compressed air piston gun with a kinetic energy absorbing element. In this case the essential differences are that the entire EXTERNAL CHASSIS DEVICE WITH INTERNAL ANCHORING SYSTEM FOR LONG GUNS is completely external to the gun, while the system cited above is internal to the gun. In addition, the utility model cited only allows moving the cassette of the trigger while the telescopic arrangement of the EXTERNAL CHASSIS DEVICE WITH INTERNAL ANCHORING SYSTEM FOR LONG GUNS disclosed allows moving the entire gun.

DESCRIPTION OF THE INVENTION

The present invention comprises a number of elements that are placed on a conventional gun with the following features:

A—External chassis housing the gun, element D, the sliding rings B, that embrace the gun and the kinetic energy absorbing element C. Element A is where the gripping components of the gun, such as the pistol grip, stock, handguard, etc. are externally anchored, as well as the sighting elements, whether standard sights or scopes, by means of an 11 mm dovetail rail or the two orifices in which to bolt any "Picattiny" or "Weaver" type rail. It also provides grooves in which to house the guide bushings, elements F, that prevent torsion movements of the gun.

B—Sliding rings with minimal friction, with an O shape, that firmly grip the gun and are held on it by bolting onto the same orifices provided in the gun to attach the conventional stock. The bolts must be set under the surface so that they do not touch the inner surface of the chassis A. With a suitable sizing of the chassis, to adapt the EXTERNAL CHASSIS DEVICE WITH INTERNAL ANCHORING SYSTEM FOR LONG GUNS to different guns, it is only necessary to change or adapt said parts B. The torsion of the gun inside the chassis is prevented by guide bushings, elements F, that slide in the grooves made in the chassis itself, element A, anchored to the sliding rings, elements B.

C—Kinetic energy absorbing element. This element can be a linear or conical metal spring, or an elastomer, or an air compression element or an electromagnet. This element C will be in charge of absorbing kinetic energy from the recoil of the gun in either direction. By only changing its properties (such as its elastic constant, for example), the EXTERNAL CHASSIS DEVICE WITH INTERNAL ANCHORING SYSTEM FOR LONG GUNS can be adapted to guns of different types and with different recoil. Element C is installed inside and at one end of element A.

D—The gun itself, not modified after its original manufacture.

E—End of stroke plug: its mission is to anchor and/or support element C. It can also plug the air compression chamber formed when inside element A element D moves linearly toward the shooter's shoulder, compressing the air by sealing element B joined to element D and acting jointly as a compression piston. With the system at rest, it does not have to withstand any load.

F—Guide bushings that slide in the grooves made in the chassis itself, element A, anchored to the sliding rings, element B by bolts. This ensures that element D does not have any movement other than the linear movement coaxial with element A.

The novelty of the EXTERNAL CHASSIS DEVICE WITH INTERNAL ANCHORING SYSTEM FOR LONG GUNS lies in the elements A, B, C, E and F. When the shooter pulls the trigger, the gun, element D, generates a recoil that is transformed into a linear movement in the direction opposite to the movement of the projectile. This movement continues to be linear as the gun, element D, slides inside element A due to elements B which offer a minimal friction and which guide the entire movement along the inside of element A in a single displacement axis, in a telescoping manner. Elements F prevent any rotation of element D inside element A. At the same time as element D starts moving, the trigger moves away from the shooter's finger and element C is compressed, absorbing the kinetic energy generated by the movement of the gun. When all of the energy is accumulated in element C, the gun will stop and element C will recover its initial position, pushing element D in the same axis but in the opposite direction. Since element C can expand, the linear movement of the gun will be a linear movement in both directions until it finally stops due to the inner friction of the elements B. Even if the trigger touches the shooter's finger again, the time elapsed is enough for the projectile to have left the barrel of element D and its trajectory will not be changed.

All of this means that the shooter will not feel any movement in their hands and/or shoulder, as the movements of the gun take place in element A and therefore the support of the assembly is ideal, thereby improving accuracy. In addition, the accuracy of the gun increases even more by preventing yanking the trigger, and prevents damage to the aiming elements, whether scopes or traditional sights, as these are placed in part A by means of a 11 mm dovetail rail or two orifices for bolting any "Picattiny" or "Weaver" type rail, and will therefore be free of the recoil movement of the gun, element D.

Figure 1:
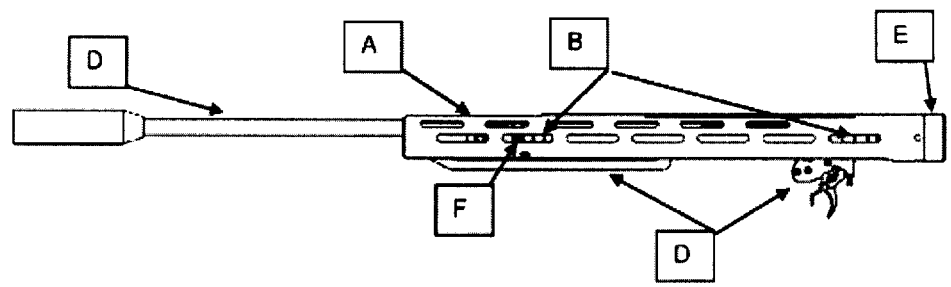
FIG. 1 is an elevation view showing the full EXTERNAL CHASSIS DEVICE WITH INTERNAL ANCHORING SYSTEM FOR LONG GUNS.
Figure 2:
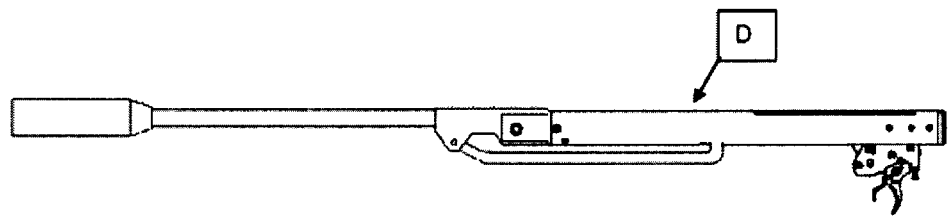
FIG. 2 is an elevation side view of the gun, element D.
Figure 3:
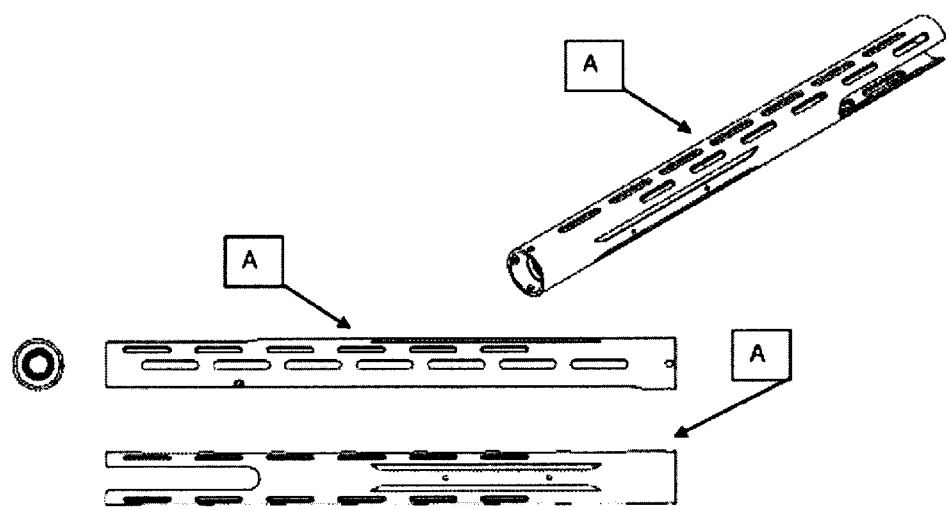
FIG. 3 shows four views of element A.
Figure 4:
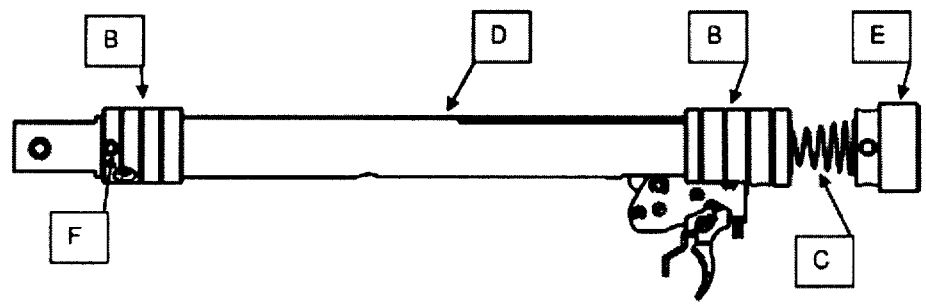
FIG. 4 is an elevation view showing two elements B placed on the element D, element C and element E according to their location inside element A.
Figure 5:
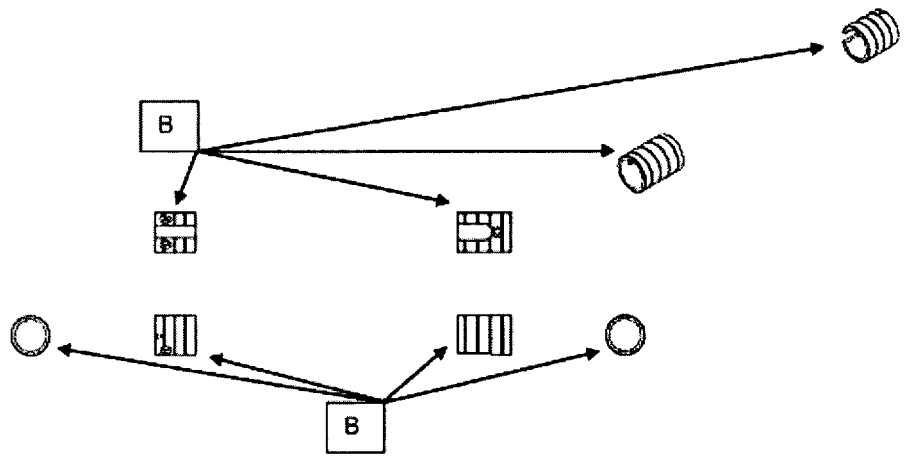
FIG. 5 shows the two elements B in various views.
Figure 6:
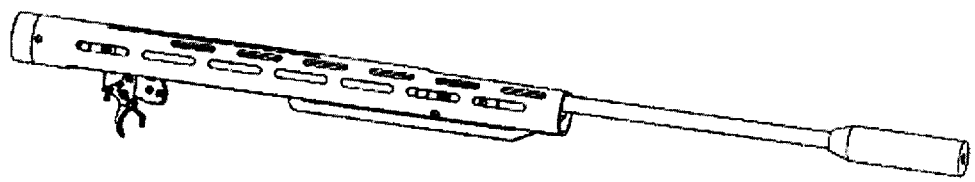
FIG. 6 shows an isometric view of the entire assembly.

A—Chassis.

B—Sliding rings.

C—Kinetic energy absorption element, in this case a metallic conical spring.

D—Conventional gun, in this case a piston compressed air carbine.

E.—Plug
F.—Guide bushings.

PREFERRED EMBODIMENT OF THE INVENTION

In view of the figures described above, it can be seen that the EXTERNAL CHASSIS DEVICE WITH INTERNAL ANCHORING SYSTEM FOR LONG GUNS comprises 5 essential parts:

A.—Chassis that houses all the elements inside. It provides a linear motion with minimal friction to elements B. It can also provide support for the installation of gripping elements: stock, handguard, pistol B.—Sliding rings. In this case two, which only allow motion along the coaxial axis of the chassis.

C.—Conical metal spring, which is installed between the gun, element D, and the plug, element E, and absorbs the movement of the gun, element D.

E.—Plug whose mission is to contain element C and which can be used as a fastening element for the gripping systems: cylinder head and/or pistol grip.

F.—Guide bushings to prevent torsional movements of the gun inside element A. They can be attached by bolts to element B. They are guided by the grooves of element A. To aid in the understanding of the invention element D, which is a conventional gun, is also shown.

The invention has been described above according to a preferential embodiment thereof, but admits multiple variations without exceeding the object of the claimed invention. These variations can be:

1.—Absence of a kinetic energy absorption element, element C. Element C is not essential depending on the length of element A, the friction of the rings, elements B and the possibility of compressing air in its final path inside element A.

2.—Number of elements B: from one to several.

3.—Type of element C: it can be a metal spring, a pneumatic spring, an air chamber, and electromagnetic element . . . etc.

4. Inclusion in element E of an orifice regulating the air flow to adjust the braking speed of element D.

5. Absence of guide rings bushings that can be replaced by internal recesses in elements B and internal guide grooves in element A.

The invention claimed is:

1. An external chassis device and internal movable anchoring system for long guns, consisting of a chassis, sliding rings, a kinetic energy absorption element, a plug, and guide bushings, characterized in that the chassis houses a conventional gun which slides coaxially inside the chassis by means of said sliding rings, which in turn are provided with said guide bushings that limit movement of said sliding rings by means of grooves made in said chassis, where sighting elements are fitted on an external upper part of said chassis, and longitudinal movement of the gun us absorbed by said kinetic energy absorption element, wherein the movement of said kinetic absorption element is limited by said plug.

2. An external chassis device: a chassis receiving a long gun, said chassis having an optical sight member for said long gun; said long gun having low-friction sliding rings for mating with said chassis and a guide bushing for sliding in grooves in said chassis, where said long gun slides coaxially within said chassis; a plug coupled to an end of said chassis to limit axial movement of said long gun in said chassis; and an absorbing element in said chassis and oriented between said long gun and said plug to absorb kinetic energy and recoil generated by said long gun and axial movement of said long gun in said chassis.

3. The external chassis of claim 2, wherein said absorbing element is selected from the group consisting of a spring, pneumatic member, air chamber, and electromagnetic element.

4. The external chassis of claim 2, wherein said low-friction sliding rings are provided at a first end of the long gun and a second opposite end of the long gun for sliding in said chassis, and where said guide bushing is coupled to said low-friction sliding rings.

\* \* \* \* \*